Oct. 19, 1926.

W. H. SIDDALL 1,603,297

METHOD OF EYEGLASS CONSTRUCTION

Filed July 21, 1925

INVENTOR
Wilbur H. Siddall
BY Robert L. Blair
ATTORNEY

Patented Oct. 19, 1926.

1,603,297

UNITED STATES PATENT OFFICE.

WILBUR H. SIDDALL, OF ATTLEBORO, MASSACHUSETTS.

METHOD OF EYEGLASS CONSTRUCTION.

Application filed July 21, 1925. Serial No. 44,960.

This invention relates to eyeglass construction and more particularly to the construction of eyeglass temple bars of the non-metallic type.

One of the objects of the invention is to provide a reenforced non-metallic temple bar which is practical and efficient, capable of affording the wearer long and dependable service. Another object is to provide such a construction in which the reenforcement is permanently made a part of the non-metallic temple bar and effectively concealed. Another object is to provide a construction of the above nature which is neat and attractive in appearance. Another object is to provide a practical art of constructing eyeglass temple bars of the above nature which may be carried on conveniently and economically. Other objects will be in part obvious or in part pointed out hereinafter.

The invention accordingly consists in the features of construction, combinations of elements, arrangements of parts and in the several steps and relation and order of each of the same to one or more of the others all as will be illustratively described herein, and the scope of the application of which will be indicated in the following claims.

In the accompanying drawing in which is shown one of the various possible embodiments of the mechanical features of this invention, Figure 1 is a side elevation of a temple bar in the process of manufacture;

Similar reference characters refer to similar parts throughout the several views of the drawing.

Figure 1:
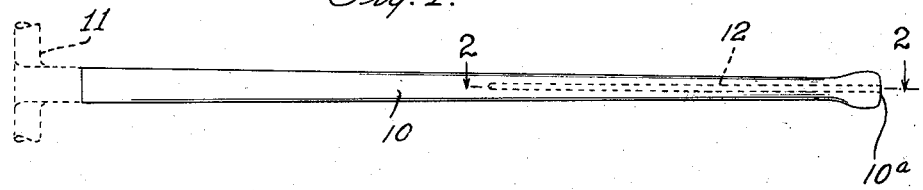

Referring now to the drawing in detail, there is shown in Figure 1 a temple bar member 10 adapted to be connected at its forward end to an eyeglass rim diagrammatically indicated by the dotted lines at 11. This temple bar member 10 is of non-metallic material such as celluloid or other similar materials employed in the manufacture of eyeglass parts. This non-metallic temple bar member 10 is of substantial thickness and of itself is substantially rigid and not easily flexed to any substantial extent.

As shown in Figure 1, the temple bar 10 in its process of manufacture, is preferably formed as a straight member. Thereafter it is bent to the desired curved contour of a temple bar, for example to the contour shown in Figure 5. As explained above, the temple bar is of itself substantially rigid and not readily flexed but, however, after it has been bent to the desired curved contour and is in use there is a tendency for the temple bar to straighten out and lose the original contour given thereto. The heat from the head of the wearer and strains placed upon the temple bar in use aid the temple bar in its tendency to thus distort and lose its desired contour. Therefore, in order to strengthen the non-metallic temple bar against such straightening out or distortion, it is reenforced.

Figure 2:
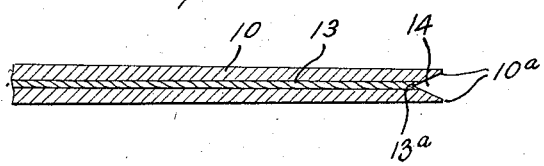
Figure 2 is a horizontal section substantially along the line 2—2 of Fig. 1.

After formation of the straight temple bar member as shown in Figure 1, there is formed therein, preferably by drilling, an axial recess or passage 12 extending from the rear end 10$^a$ of the temple bar preferably to a point in advance of the portion thereof which is to be curved. Into this recess is inserted a reenforcing member 13, as shown in Figure 2, this reenforcing member being preferably a metal wire of any desired cross-section. Preferably this wire member is of the type described in the co-pending application of George E. Nerney, Serial No. 44,962, filed July 21, 1925, although it is to be understood that this invention is not limited as to the type of reenforcing wire employed.

Figure 3:
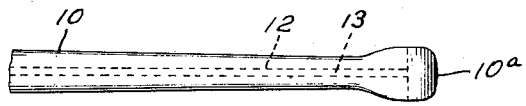
Figure 3 is a side elevation of the parts shown in Fig. 2.

The end portion 10$^a$ of the temple bar is preferably flattened and widened in a vertical direction, so as to provide a widened and comfortable bearing surface against the head. As is seen by comparison of Figures 2 and 3, this end portion 10$^a$ is preferably of substantially greater width in a vertical direction than it is in a horizontal direction.

The wire member 13 is of such length that its rear end 13$^a$ is spaced forwardly from the rear end of the temple bar member 10. In the end portion 10$^a$ rearwardly of the end 13$^a$ of the wire is cut a groove or slot 14 which may be termed substantially diametrical since it extends preferably through the temple bar from one side thereof to the opposite side. This groove 14 extends the wide way of the end portion 10ª, that is, from the top side to the bottom side of the temple bar. Preferably the groove is substantially V-shaped as clearly seen in Figure 2.

Figure 4:
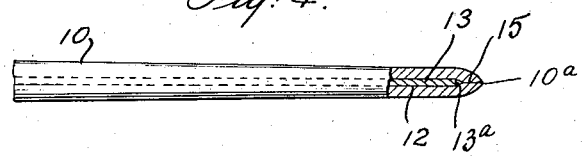
Figure 4 is a top plan view, partially cut away, of the parts shown in Figs. 2 and 3 and at a later stage of the process.

The wire member 13 having been inserted in the straight temple bar, and the groove 14 having been formed as by cutting away the material, the end portion 10ª about the groove 14 is now softened by suitable means, as by heating or by suitable solvent. The softened material on the two sides of the groove are then pressed inwardly together, as shown in Figure 4, forming a seam 15 along which the material may be joined by fusing together of the non-metallic material or, if desired, by a suitable cement. The opening in the rear of the temple bar member left by the insertion of the wire 13 is thus closed in an effective and permanent manner and neatly.

Figure 5:
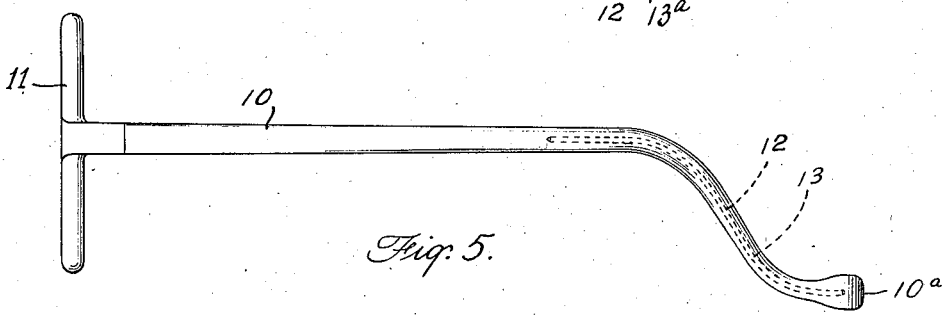
Figure 5 is a side elevation of a completed temple bar.

The shaping of the straight temple bar member to the desired curved contour, for example, as shown in Figure 5, is preferably now done, although if desired, this shaping may be done before the rear end is closed, as above described. The shaping is accomplished by suitable softening of the non-metallic material and then bending the same with the reenforcing wire 13 therein.

It will be seen that the above manner of closing the opening left by the insertion of the reenforcing wire accomplishes the desired results in a simple, efficient and thorough fashion. There are employed no auxiliary parts in the nature of plugs which may become loose and work out of place. Moreover, when the material at the sides of the V-shaped groove is pressed in together to form the seam 15, the resultant temple bar end is tapered to a smooth rounded upright edge, as brought out in Figure 4. This shape is advantageous in permitting convenient insertion of the temple bar through the hair of the wearer and into place.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim as my invention:

1. The herein described art of eyeglass temple bar construction which consists in inserting endwise into the rear portion of a non-metallic temple bar a reenforcing wire, removing from said temple bar a portion of the material thereof in back of the rear end of said wire, softening the end portion of the temple bar, and pressing together the parts of said temple bar about the space left by said removal of material to close the opening left by the insertion of said reenforcing wire.

2. The herein described art of eyeglass temple bar construction which consists in inserting endwise into the rear portion of a non-metallic temple bar a reenforcing wire, cutting a substantially V-shaped groove in the rear end of said temple bar, softening the end portion of the temple bar, and squeezing together the walls of said V-shaped groove to close the opening left by the insertion of said reenforcing wire.

3. The herein described art of eyeglass temple bar construction which consists in inserting endwise into the rear portion of a non-metallic temple bar a reenforcing wire, removing a portion of the material of said temple bar at the rear end thereof to form in said rear end a diametrical groove, softening the rear end of said temple bar, and forcing in toward each other the walls of said groove to close the opening left by the insertion of said wire.

4. The herein described art of eyeglass temple bar construction which consists in inserting a reenforcing wire axially into a straight non-metallic temple bar member from the rear end thereof, removing a portion of the material of said rear end of said temple bar member to form therein a substantially transverse groove, softening the rear end of said temple bar member, squeezing together the walls of said groove to close the opening left by the insertion of said reenforcing wire, and then bending the rear portion of said straight reenforced temple bar member to a curved contour.

5. The herein described art of eyeglass temple bar construction which consists in inserting a reenforcing wire axially into a straight non-metallic temple bar member from the rear end thereof, removing a portion of the material of said rear end of said temple bar member to form therein a substantially V-shaped transverse groove, softening the rear end of said temple bar member, squeezing together the walls of said groove to close the opening left by the insertion of said reenforcing wire, and then bending the rear portion of said straight reenforced temple bar member in a curved contour.

In testimony whereof, I have signed my name to this specification this sixteenth day of July, 1925.

WILBUR H. SIDDALL.